US010952023B2

(12) United States Patent
Tamura et al.

(10) Patent No.: US 10,952,023 B2
(45) Date of Patent: Mar. 16, 2021

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventors: Yusuke Tamura, Kanagawa (JP); Tomoyuki Shimizu, Kanagawa (JP); Kazuya Tanaka, Kanagawa (JP); Yasuhiro Ito, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 425 days.

(21) Appl. No.: 15/808,428

(22) Filed: Nov. 9, 2017

(65) Prior Publication Data

US 2018/0352380 A1 Dec. 6, 2018

(30) Foreign Application Priority Data

May 31, 2017 (JP) .............................. JP2017-107388

(51) Int. Cl.
*H04W 4/02* (2018.01)
*H04M 1/725* (2006.01)

(52) U.S. Cl.
CPC ....... *H04W 4/025* (2013.01); *H04M 1/72572* (2013.01)

(58) Field of Classification Search
CPC ....... H04W 4/024; H04W 4/025; H04W 4/02; H04M 1/72572; G01C 21/32; H04L 67/18

See application file for complete search history.

(56) References Cited

U.S. PATENT DOCUMENTS

2017/0211943 A1* 7/2017 Ettinger ............. G01C 21/3476
2019/0145790 A1* 5/2019 Ettinger ............. G01C 21/3476
701/426

FOREIGN PATENT DOCUMENTS

| JP | 2002-181561 A | 6/2002 |
| JP | 2002-260002 A | 9/2002 |
| JP | 2005-077929 A | 3/2005 |
| JP | 2006-227637 A | 8/2006 |
| JP | 2013-061830 A | 4/2013 |
| JP | 2013-083583 A | 5/2013 |

OTHER PUBLICATIONS

Jan. 19, 2021 Office Action issued in Japanese Patent Application No. 2017-107388.

* cited by examiner

*Primary Examiner* — Diane D Mizrahi
(74) *Attorney, Agent, or Firm* — Oliff PLC

(57) ABSTRACT

An information processing apparatus includes an acquisition unit, a reception unit, and an output unit. The acquisition unit acquires electronic pictorial map information based on a pictorial map. The reception unit receives information of a desired position to be output onto the pictorial map. The output unit outputs the position received by the reception unit onto the pictorial map information, based on characteristic information on the pictorial map information and electronic map information in which position identification information including the position to be output onto the pictorial map is set.

17 Claims, 13 Drawing Sheets

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-107388 filed May 31, 2017.

BACKGROUND

Technical Field

The present invention relates to an information processing apparatus and a non-transitory computer readable medium.

SUMMARY

According to an aspect of the invention, there is provided an information processing apparatus including an acquisition unit, a reception unit, and an output unit. The acquisition unit acquires electronic pictorial map information based on a pictorial map. The reception unit receives information of a desired position to be output onto the pictorial map. The output unit outputs the position received by the reception unit onto the pictorial map information, based on characteristic information on the pictorial map information and electronic map information in which position identification information including the position to be output onto the pictorial map is set.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described in detail with reference to drawings.

Figure 1:
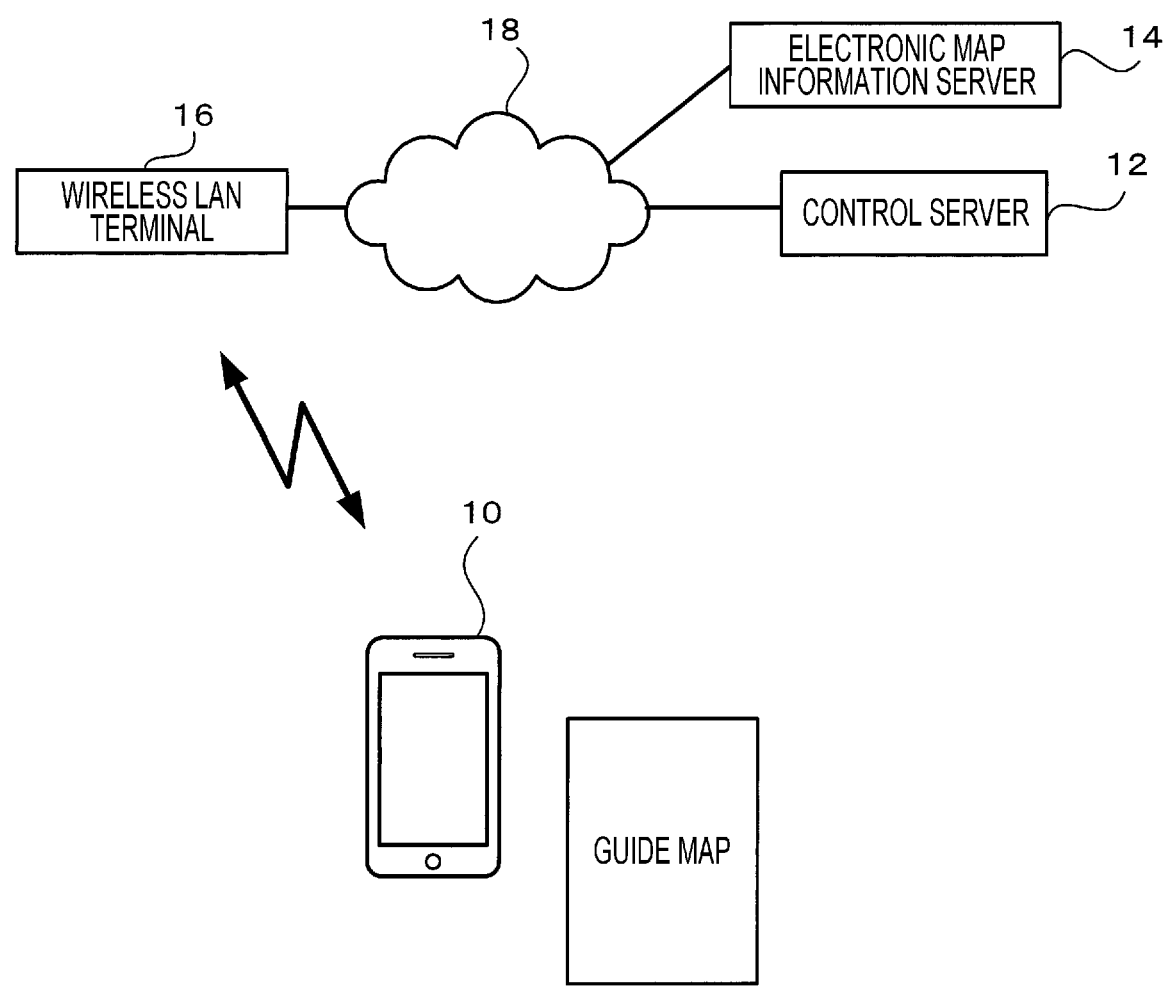
FIG. 1 is a system diagram illustrating a configuration of an information processing system according to an exemplary embodiment of the present invention.

FIG. 1 is a system diagram illustrating a configuration of an information processing system according to an exemplary embodiment of the present invention.

An information processing system according to an exemplary embodiment of the present invention includes, as illustrated in FIG. 1, an information processing apparatus 10 such as a smartphone or a tablet terminal apparatus, a control server 12, and an electronic map information server 14 as an external service.

The information processing apparatus 10 and the control server 12 are connected to each other via a wireless local area network (LAN) terminal 16 such as a Wi-Fi® router or an Internet communication network 18, and perform transmission and reception of information.

The control server 12 is connected to the electronic map information server 14 via the Internet communication network 18, and is configured to acquire electronic map information stored in the electronic map information server 14.

The electronic map information server 14 stores electronic map information in which position identification information such as latitude and longitude information is set. The electronic map information server 14 may be, for example, a server which provides various data such as Google Maps provided by Google® or Yahoo Maps provided by Yahoo!®.

The present invention is applicable to any type of information processing apparatus 10 as long as it may be connected to the control server 12 via a communication network. In this exemplary embodiment, a case where the information processing apparatus 10 is a tablet terminal apparatus including an input device, such as a camera, which may acquire image information and a touch panel supporting touch input, will be described.

The information processing apparatus 10 is carried by a user, and is used to read, with the input device such as a camera or a scanner, a deformed pictorial map such as a guide map on a paper medium and indicate a desired position to be indicated on electronic pictorial map information.

Pictorial maps represent maps, such as guide maps on a paper medium, in which position identification information such as latitude and longitude information is not set. For example, deformed pictorial maps in which landmarks as targets or symbol objects such as shrines, parks, and car parks are indicated are used.

Figure 2:
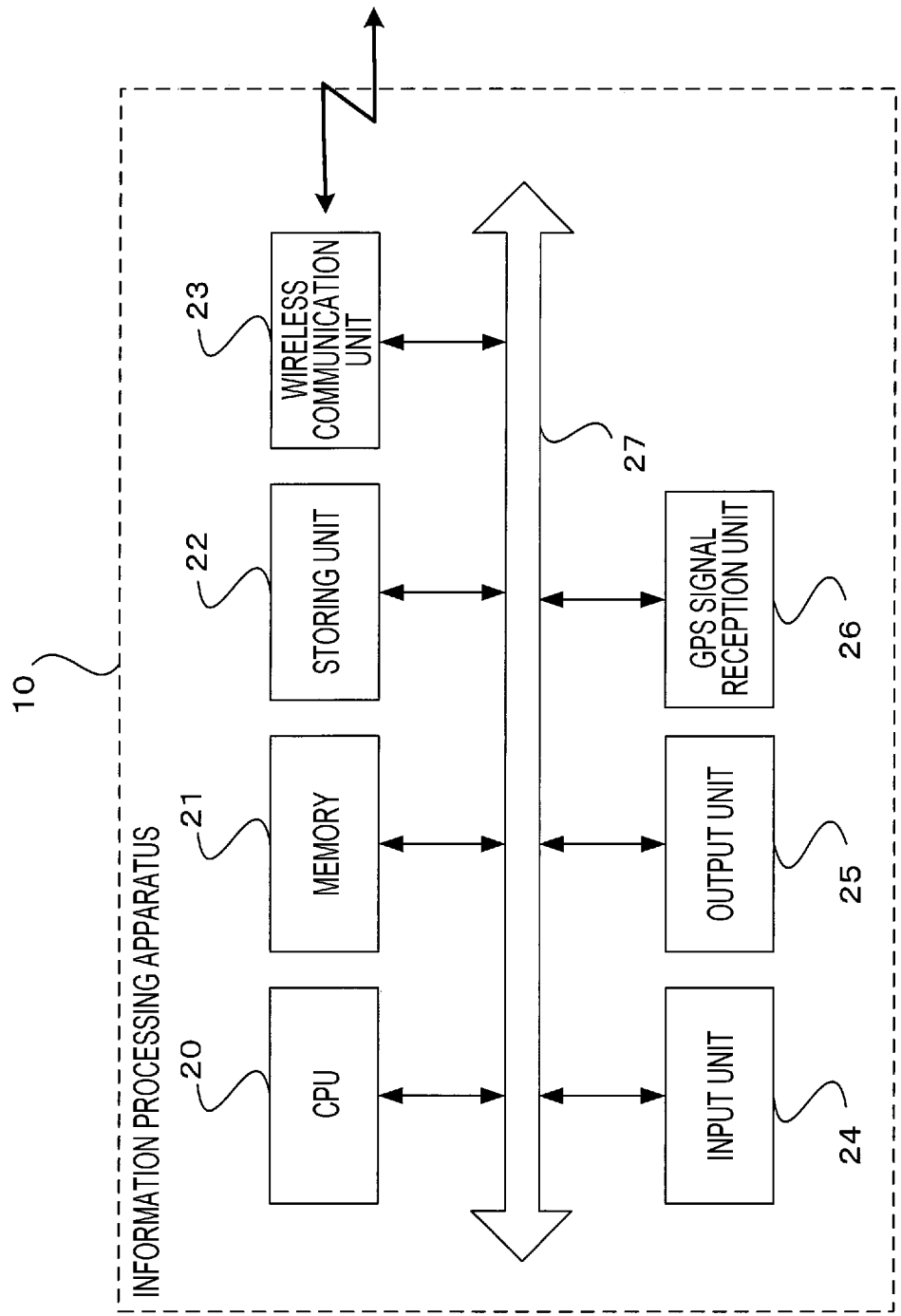
FIG. 2 is a block diagram illustrating a hardware configuration of an information processing apparatus according to an exemplary embodiment of the present invention.

FIG. 2 illustrates a hardware configuration of the information processing apparatus 10 in an information processing system according to an exemplary embodiment.

The information processing apparatus 10 includes, as illustrated in FIG. 2, a central processing unit (CPU) 20, a memory 21 that may temporarily store data, a storing unit 22 such as a flash memory, a wireless communication unit 23 that performs wireless communication with the wireless LAN terminal 16 to transmit and receive data, an input unit 24 such as a camera and a touch sensor, an output unit 25 such as a display device, and a global positioning system (GPS) signal reception unit 26. These components are connected to one another via a control bus 27.

In the information processing apparatus 10 according to this exemplary embodiment, the touch sensor as the input unit 24 for detecting a touch position is provided on a touch panel as the output unit 25. With the use of the touch panel, display and input by a user are performed.

The CPU 20 performs predetermined processing in accordance with a control program stored in the memory 21 or the storing unit 22 to control an operation of the information processing apparatus 10. The control program may be obtained by being downloaded via the Internet communication network 18 or a mobile phone line network and supplied to the CPU 20 or may be stored in a storage medium such as a compact disc-read only memory (CD-ROM) and supplied to the CPU 20.

The GPS signal reception unit 26 includes a GPS antenna. The GPS signal reception unit 26 functions as a positional information acquisition unit that receives a signal from a GPS satellite and acquires positional information of the current position including position identification information such as latitude and longitude information of the information processing apparatus 10.

Figure 3:
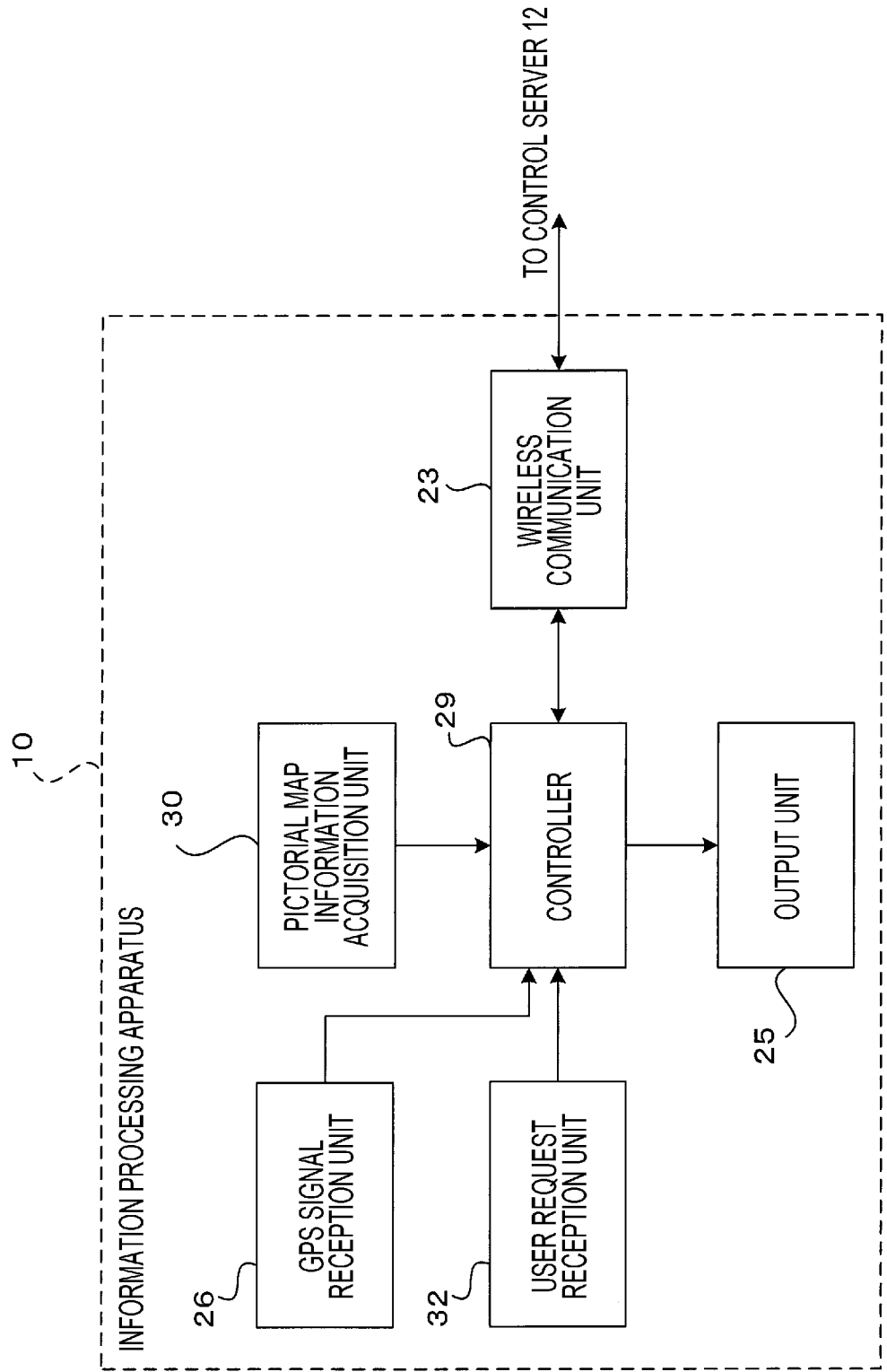
FIG. 3 is a block diagram illustrating a functional configuration of an information processing apparatus according to an exemplary embodiment of the present invention.

FIG. 3 is a block diagram illustrating a functional configuration of the information processing apparatus 10 that is implemented by execution of the control program.

The information processing apparatus 10 according to this exemplary embodiment includes, as illustrated in FIG. 3, a wireless communication unit 23, an output unit 25, a GPS signal reception unit 26, a controller 29, a pictorial map information acquisition unit 30, and a user request reception unit 32.

The pictorial map information acquisition unit 30 functions as an acquisition unit that reads, with a camera as the input unit 24, a pictorial map such as a guide map on a paper medium to acquire electronic pictorial map information.

The user request reception unit 32 functions as a reception unit that receives information of a desired position to be output onto a pictorial map. The user request reception unit 32 also receives, as information of a position that a user desires to output onto a pictorial map, positional information of the current position received by the GPS signal reception unit 26.

Moreover, the user request reception unit 32 functions as a language reception part that receives specification of a language to be output onto pictorial map information.

The output unit 25 functions as an output unit that outputs a position received by the user request reception unit 32, based on characteristic information on electronic pictorial map information acquired by the pictorial map information acquisition unit 30 and electronic map information in which position identification information including a desired position to be output onto a pictorial map is set, onto pictorial map information.

The output unit 25 also translates the name of a landmark on pictorial map information into a language received by the user request reception unit 32 or a language that is normally used in the information processing apparatus 10, and outputs the name translated into the received language or the language that is normally used in the information processing apparatus 10.

Moreover, the output unit 25 outputs additional information related to a landmark on pictorial map information onto the pictorial map information.

Figure 4:
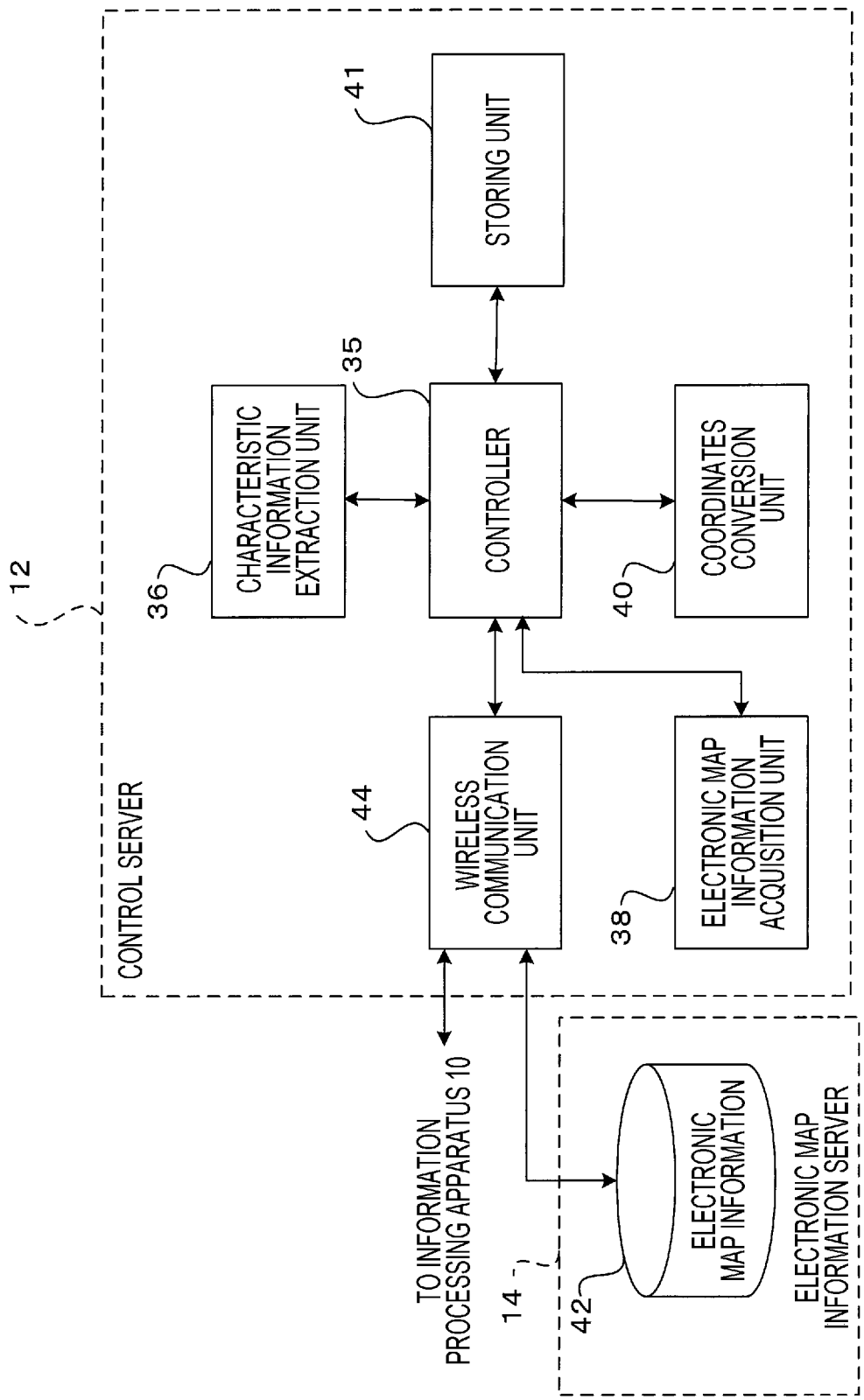
FIG. 4 is a block diagram illustrating a functional configuration of a control server according to an exemplary embodiment of the present invention.

FIG. 4 is a block diagram illustrating a functional configuration of the control server 12 implemented when the above-mentioned control program is executed.

The control server 12 according to this exemplary embodiment includes, as illustrated in FIG. 4, a controller 35, a characteristic information extraction unit 36, an electronic map information acquisition unit 38, a coordinates conversion unit 40, a storing unit 41, and a wireless communication unit 44 that performs wireless communication with the wireless LAN terminal 16 to perform transmission and reception of data.

The controller 35 acquires pictorial map information and positional information of a user from the information processing apparatus 10 via the wireless communication unit 44.

The characteristic information extraction unit 36 extracts, using an optical character recognition/reader (OCR) technology, the name of a landmark on pictorial map information and the position of the name on the pictorial map information as characteristic information. The characteristic information extraction unit 36 also extracts, using the OCR technology, the name of a landmark on pictorial map information and the position of a map symbol of the landmark and a symbol representing the position of a dot or the like as characteristic information. Moreover, the characteristic information extraction unit 36 extracts, using an image analysis technology, the position of an intersection of roads on pictorial map information, the shape of blocks divided by a road, and the shape of a road as characteristic information. Characteristic information represents a specific position on a pictorial map and is necessary for association between pictorial map information and electronic map information.

The electronic map information acquisition unit 38 acquires electronic map information 42 around acquired positional information of a user from the electronic map information server 14. The electronic map information server 14 stores the electronic map information 42 in which position identification information such as latitude and longitude information is set.

The coordinates conversion unit 40 extracts characteristic information corresponding to characteristic information extracted from pictorial map information from the electronic map information 42 around positional information of a user, and extracts the positional information from the characteristic information extracted from the electronic map information 42. Then, coordinates conversion is performed by changing the vertical and horizontal scale of coordinates of plural pieces of characteristic information extracted from the electronic map information 42, based on coordinates of plural pieces of characteristic information extracted from pictorial map information.

The controller 35 estimates the position on the pictorial map that is received by the user request reception unit 32, based on a relative positional relationship between the plural pieces of characteristic information on the pictorial map information and the plural pieces of characteristic information on the electronic map information 42 corresponding to the plural pieces of characteristic information on the pictorial map information.

Moreover, the controller 35 estimates the position on the pictorial map received by the user request reception unit 32, based on the shape of blocks divided by a road on the pictorial map information extracted as characteristic information by the characteristic information extraction unit 36 and the shape of blocks divided by a road on the electronic map information 42 in which position identification information including a desired position to be output onto the pictorial map is set.

Furthermore, the controller 35 estimates the position on the pictorial map received by the user request reception unit 32, based on the shape of a road on the pictorial map information extracted as characteristic information by the characteristic information extraction unit 36 and the shape of a road on the electronic map information 42 in which position identification information including a desired position to be output onto the pictorial map is set.

Then, the controller 35 synthesizes an estimated position, which is received by the user request reception unit 32, on the pictorial map information, and transmits the resultant pictorial map information to the information processing apparatus 10 via the wireless communication unit 44.

Figure 5:
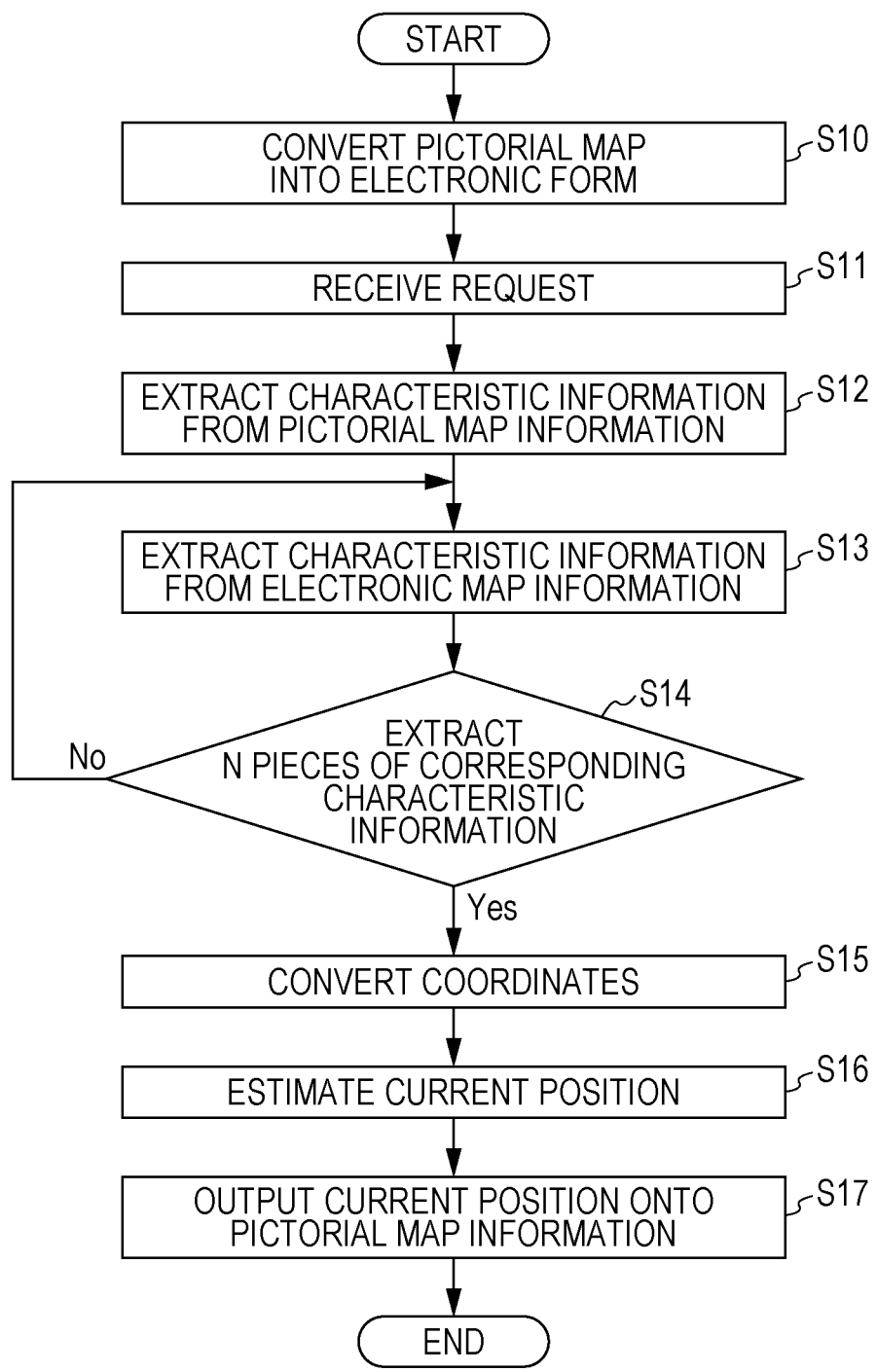
FIG. 5 is a flowchart illustrating an operation of an information processing system according to an exemplary embodiment of the present invention.

FIG. 5 is a flowchart illustrating an example of an operation of an information processing system according to an exemplary embodiment of the present invention. A case where the current position of a user is output onto a display screen as the output unit 25 of the information processing apparatus 10 will be explained as an example.

Figure 6:
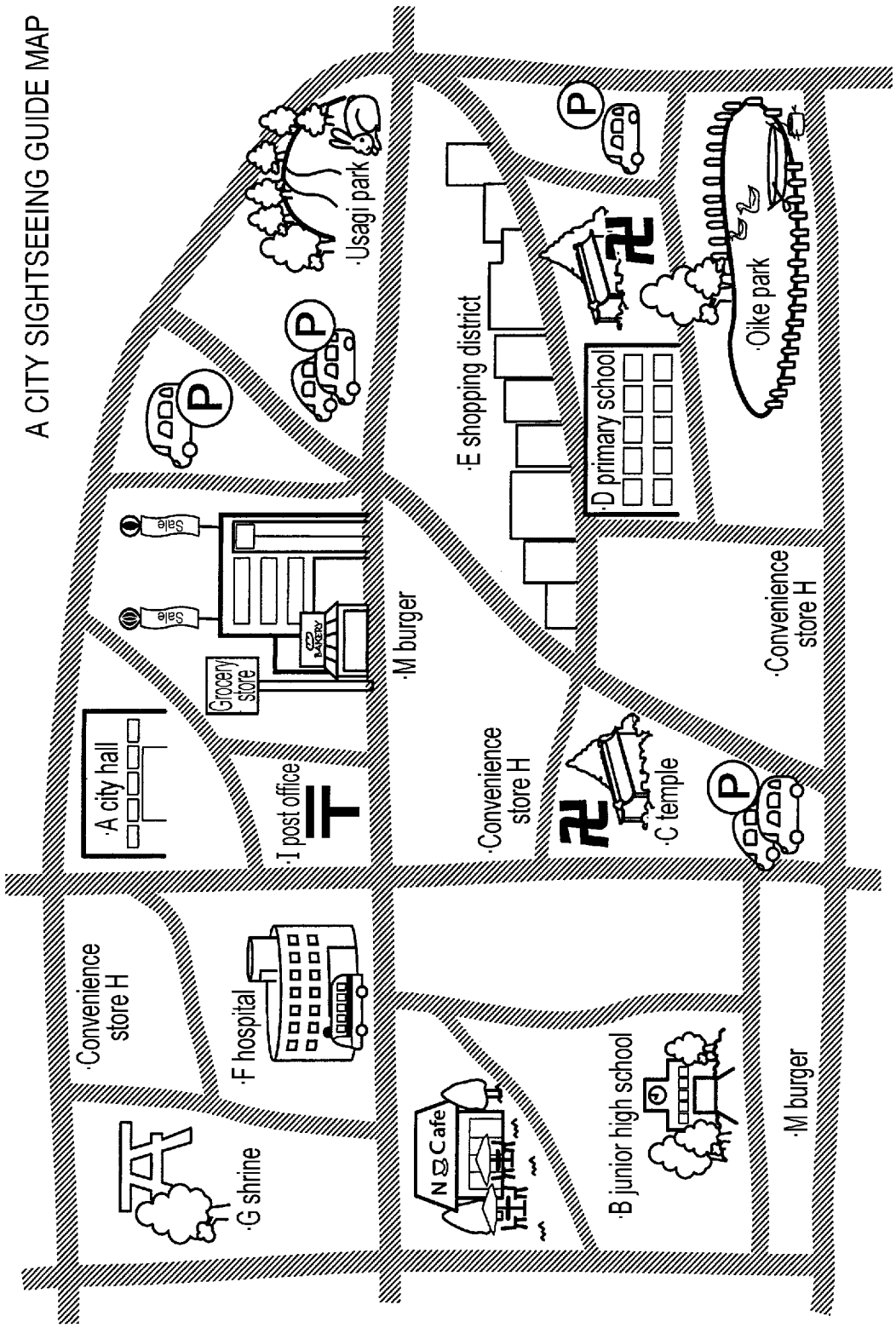
FIG. 6 is a diagram illustrating an example of a pictorial map captured into an information processing apparatus according to an exemplary embodiment of the present invention.

First, an image of a pictorial map such as a guide map illustrated in FIG. 6 is captured by a camera of the information processing apparatus 10, and the acquired pictorial map image is converted into electronic pictorial map information (step S10).

A request is received by the user request reception unit 32, and positional information of the current position of a user is received by the GPS signal reception unit 26 (step S11). Then, the controller 29 transmits the pictorial map information and the positional information of the user to the control server 12 via the wireless communication unit 23.

The control server 12 receives the pictorial map information and the positional information of the user via the wireless communication unit 44. Then, the controller 35 extracts, with the characteristic information extraction unit 36, the name of a landmark on the pictorial map information and the position of the name on the pictorial map information, using the OCR technology (step S12).

Specifically, the controller 35 extracts, using the OCR technology, "A City Hall", "B Junior High School", "C Temple", "I Post Office", "Usagi Park", "D Primary School", and the like, which are the names of landmarks on pictorial map information of the guide map illustrated in FIG. 6, and positions of the names of the landmarks on the pictorial map information. For example, center coordinates of the name of a landmark are used as the position of the name on pictorial map information.

At this time, the controller 35 preferentially extracts, from among plural pieces of characteristic information extracted by the characteristic information extraction unit 36, the name of a landmark that is less likely to be the same as other information. Specifically, names of landmarks that are less likely to be the same as other information, such as "A City Hall", "B Junior High School", "C Temple", and "I Post Office", illustrated in FIG. 6 are extracted more preferentially than names of landmarks that are highly likely to be the same as other information, such as "Convenience Store H" and "M Burger".

Figure 7:
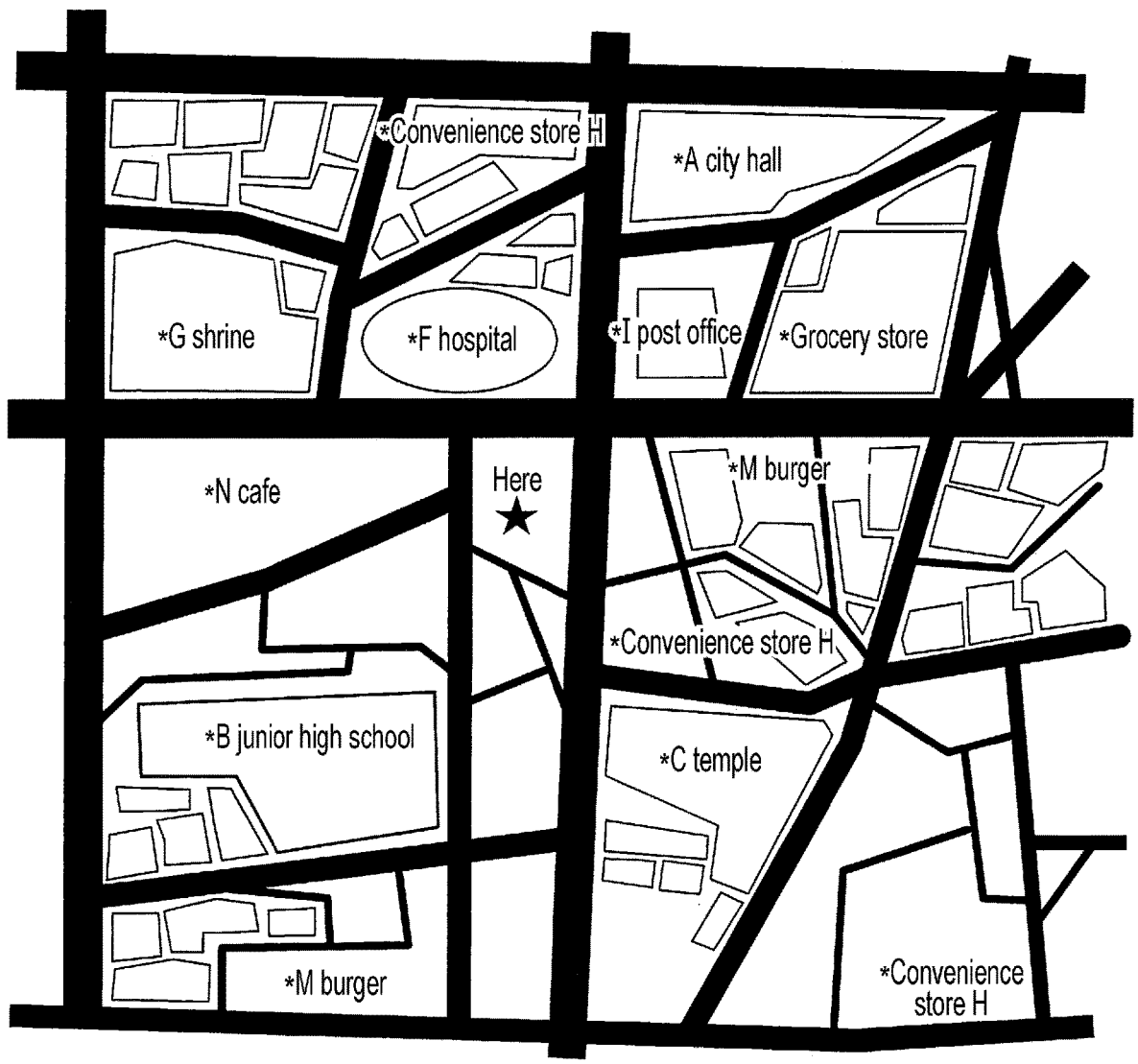
FIG. 7 is a diagram illustrating an example of electronic map information which indicates around the current position of a user using an electronic map information server.

The controller 35 acquires the electronic map information 42 illustrated in FIG. 7 from the electronic map information server 14, based on the positional information of the user, and extracts characteristic information corresponding to characteristic information extracted from the pictorial map information preferentially from around the current position of the user (a star symbol in FIG. 7) from the electronic map information 42 (step S13).

Figure 8A:
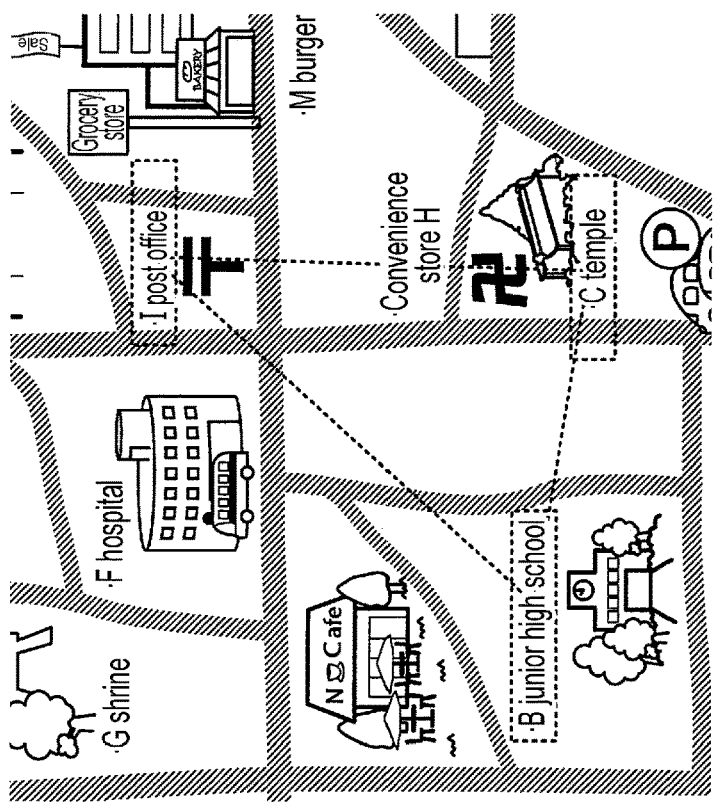
FIGS. 8A and 8B are diagrams for explaining a characteristic information extraction operation in an exemplary embodiment of the present invention.
Figure 8B:
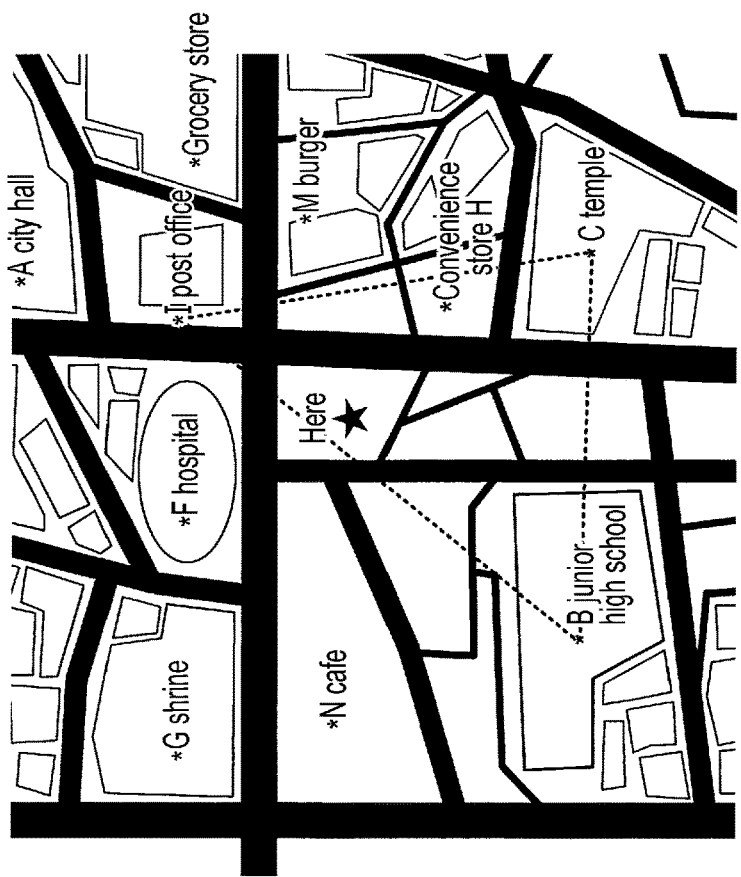

Specifically, the controller 35 extracts, for example, positional information of "I Post Office", "B Junior Hight School", and "C Temple", which is characteristic information around the current position of the user (star symbol in FIG. 8B), from among the plural pieces of characteristic information extracted from the pictorial map information, as illustrated in FIG. 8B. Position identification information such as latitude and longitude information is used as positional information.

Then, it is determined whether N, which is a predetermined value, for example, at least three, pieces of characteristic information corresponding to characteristic information on pictorial map information are extracted from the electronic map information 42 (step S14). In the case where three pieces of characteristic information are not extracted (No in step S14), the process returns to the operation for extracting characteristic information from the electronic map information (step S13).

In the case where it is determined that three pieces of corresponding characteristic information are extracted from the electronic map information 42 (Yes in step S14), coordinates conversion of the characteristic information on the electronic map information in which position identification information including the current position of the user is set is performed, based on the characteristic information preferentially extracted from the pictorial map information (step S15), the current position on the pictorial map is estimated, based on a relative positional relationship between the characteristic information on the pictorial map information and the characteristic information on the pictorial map information around the current position on the electronic map information (step S16), and the estimated current position is transmitted to the information processing apparatus 10.

Specifically, the current position on the pictorial map information is estimated, based on a relative positional relationship between center coordinates of labels of "I Post Office", "B Junior High School", and "C Temple" extracted from the pictorial map information illustrated in FIG. 8A and coordinates including the positional information of "I Post Office", "B Junior High School", and "C Temple" extracted from the electronic map information illustrated in FIG. 8B.

Figure 9:
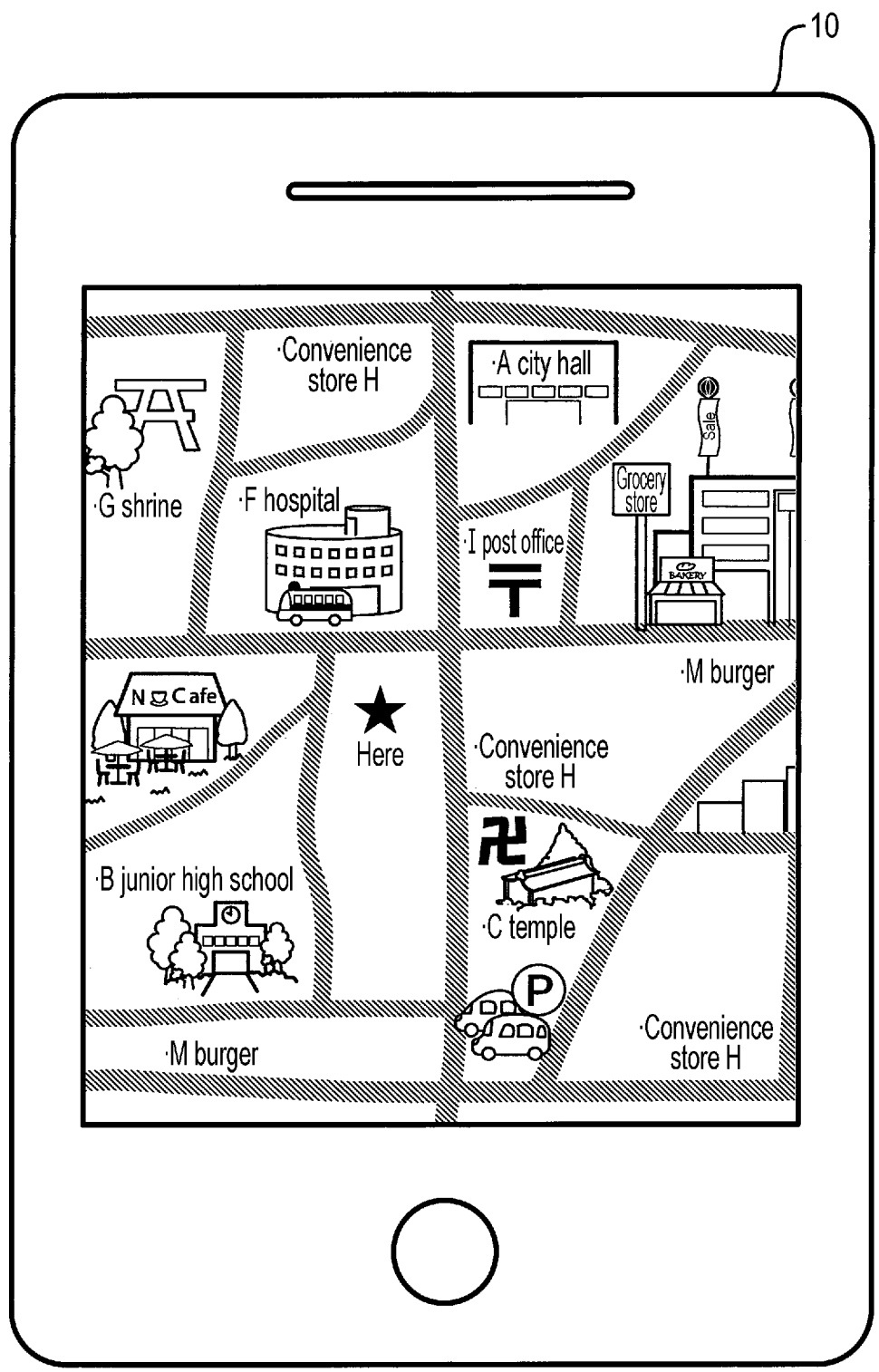
FIG. 9 is a diagram illustrating an example of an output result of an information processing apparatus according to an exemplary embodiment of the present invention.

Then, the output unit 25 synthesizes the estimated current position on the pictorial map information and outputs the resultant pictorial map information (step S17), and the current position of the user is thus indicated on the pictorial map information on the display screen of the information processing apparatus 10, as illustrated in FIG. 9.

Next, a characteristic information extraction operation of the characteristic information extraction unit 36 in modifications will be described.

[First Modification]

Figure 10A:
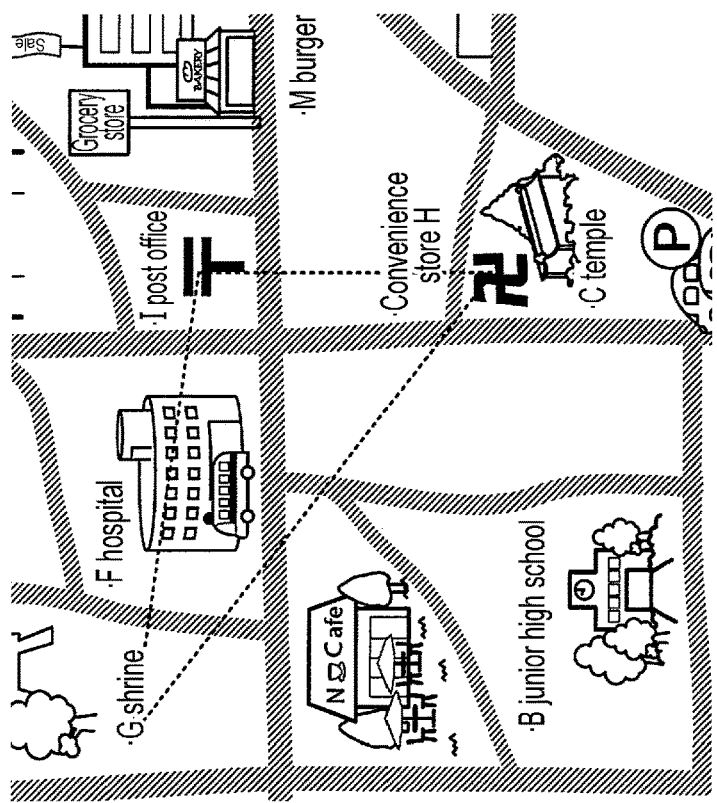
FIGS. 10A and 10B are diagrams for explaining a characteristic information extraction operation in a modification of an exemplary embodiment of the present invention.
Figure 10B:
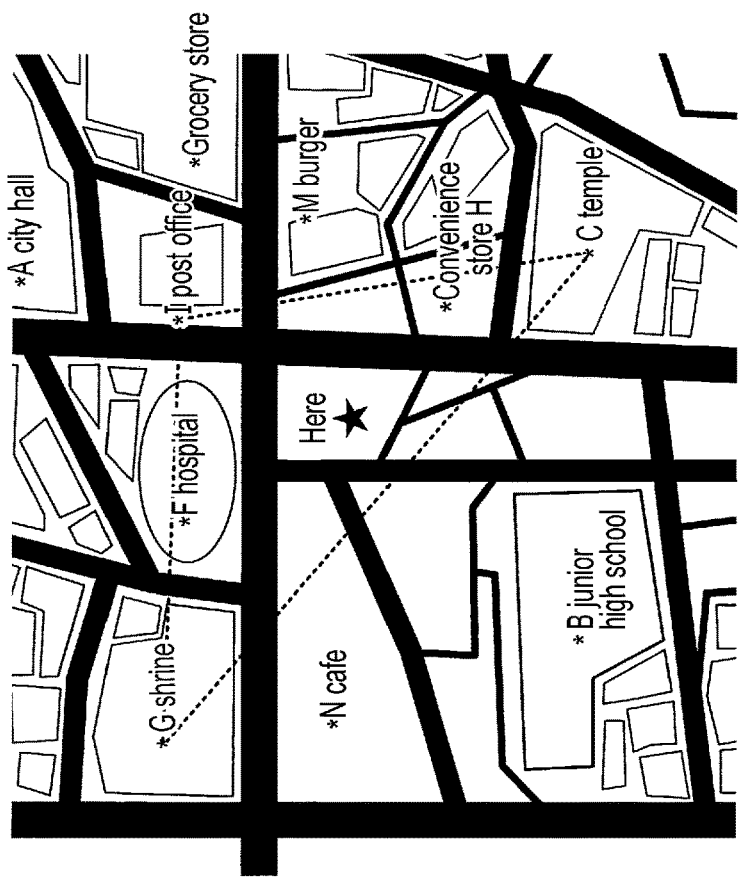

FIG. 10A is a diagram for explaining an operation for extracting characteristic information from pictorial map information, and FIG. 10B is a diagram for explaining an operation for extracting characteristic information from electronic map information.

In this modification, the characteristic information extraction unit 36 extracts, using the OCR technology, the name of a landmark on pictorial map information and the position of a symbol representing the position of the landmark as characteristic information. That is, in extraction of characteristic information from pictorial map information, a map symbol and a landmark assigned a dot are extracted preferentially.

Specifically, "I Post Office" and "C Temple" assigned map symbols, "G Shrine" assigned a dot, and the like are extracted as characteristic information from pictorial map information. Coordinates of a map symbol or a dot on pictorial map information are used as positional information of a landmark on the pictorial map information.

The controller 35 extracts, for example, positional information of "I Post Office", "C Temple", and "G Shrine", which is characteristic information around the current position of a user (star symbol in FIG. 10B), as illustrated in FIG. 10B, from among plural pieces of characteristic information extracted from the pictorial map information, from the electronic map information 42. Position identification information such as latitude and longitude information is used as positional information.

Then, the current position on the pictorial map information is estimated based on a relative positional relationship between coordinates of positions of symbols of "I Post Office", "C Temple", and "G Shrine" extracted from the pictorial map information illustrated in FIG. 10A and coordinates including positional information of "I Post Office", "C Temple", and "G Shrine" extracted from the electronic map information illustrated in FIG. 10B, and the current position of the user is indicated on the pictorial map information on the display screen of the information processing apparatus 10, as illustrated in FIG. 9.

[Second Modification]

Figure 11A:
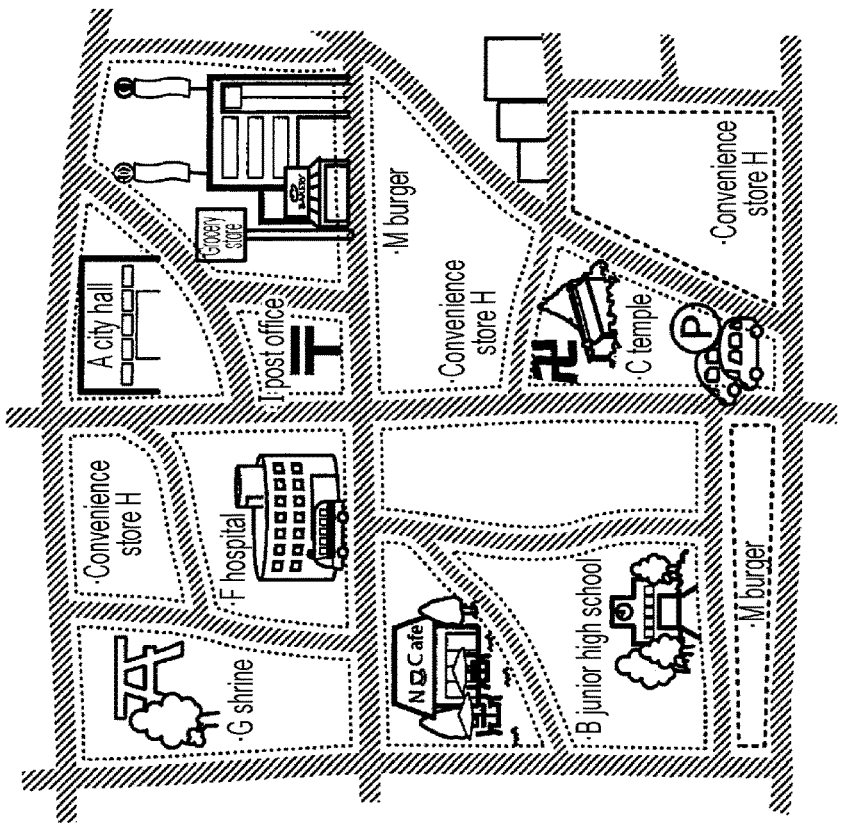
FIGS. 11A and 11B are diagrams for explaining a characteristic information extraction operation in a modification of an exemplary embodiment of the present invention.
Figure 11B:
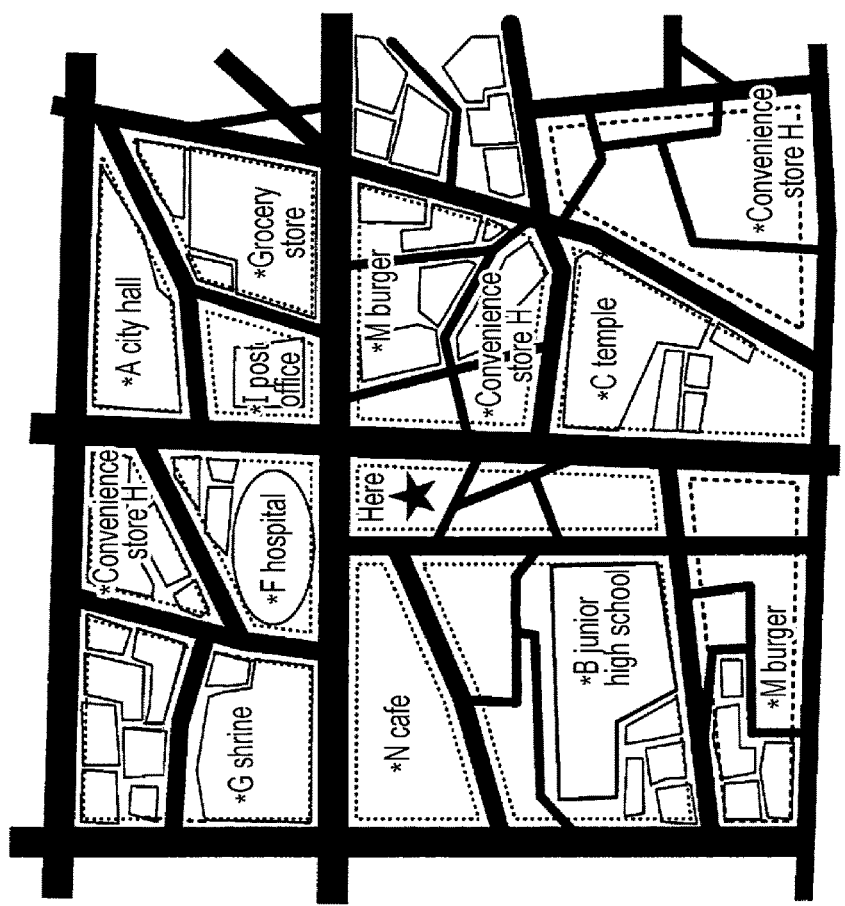

FIG. 11A is a diagram for explaining an operation for extracting characteristic information from pictorial map information, and FIG. 11B is a diagram for explaining an operation for extracting characteristic information from electronic map information.

In this modification, the characteristic information extraction unit 36 extracts, using an image analysis technology, the shape of blocks divided by a road on pictorial map information as characteristic information. Specifically, as illustrated in FIG. 11A, shapes of plural blocks (in FIG. 11A, thirteen blocks in total) are extracted from pictorial map information. Then, as illustrated in FIG. 11B, the characteristic information extraction unit 36 is connected to the electronic map information server 14, image analysis of electronic map information around the current positional information acquired from the information processing apparatus 10 is performed, and shapes of blocks corresponding to shapes of blocks extracted from the pictorial map information are extracted from the electronic map information.

Then, the controller 35 estimates the current position on the pictorial map information, based on the correspondence between the shape of a block obtained by division by a road on the pictorial map information extracted as characteristic information from the characteristic information extraction unit 36 illustrated in FIG. 11A and the shape of a block including the current position obtained by division by the road extracted from the electronic map information illustrated in FIG. 11B, and the current position of the user is indicated on the pictorial map information on the display screen of the information processing apparatus 10, as illustrated in FIG. 9.

In this modification, an example in which the shape of a block obtained by division by a road is extracted as characteristic information using an image analysis technology has been described. However, the present invention is not limited to this. The shape of roads such as a T junction, a three-way junction, or a five-way junction may be extracted as characteristic information.

Next, an output result of the information processing apparatus 10 in a modification of an exemplary embodiment of the present invention will be described.

[Third Modification]

The information processing apparatus 10 according to an exemplary embodiment may translate the name of a landmark on pictorial map information into a language received by the user request reception unit 32 or a language that is normally used in the information processing apparatus 10 and output the name translated into the received language or the language that is normally used in the information processing apparatus 10.

Figure 12:
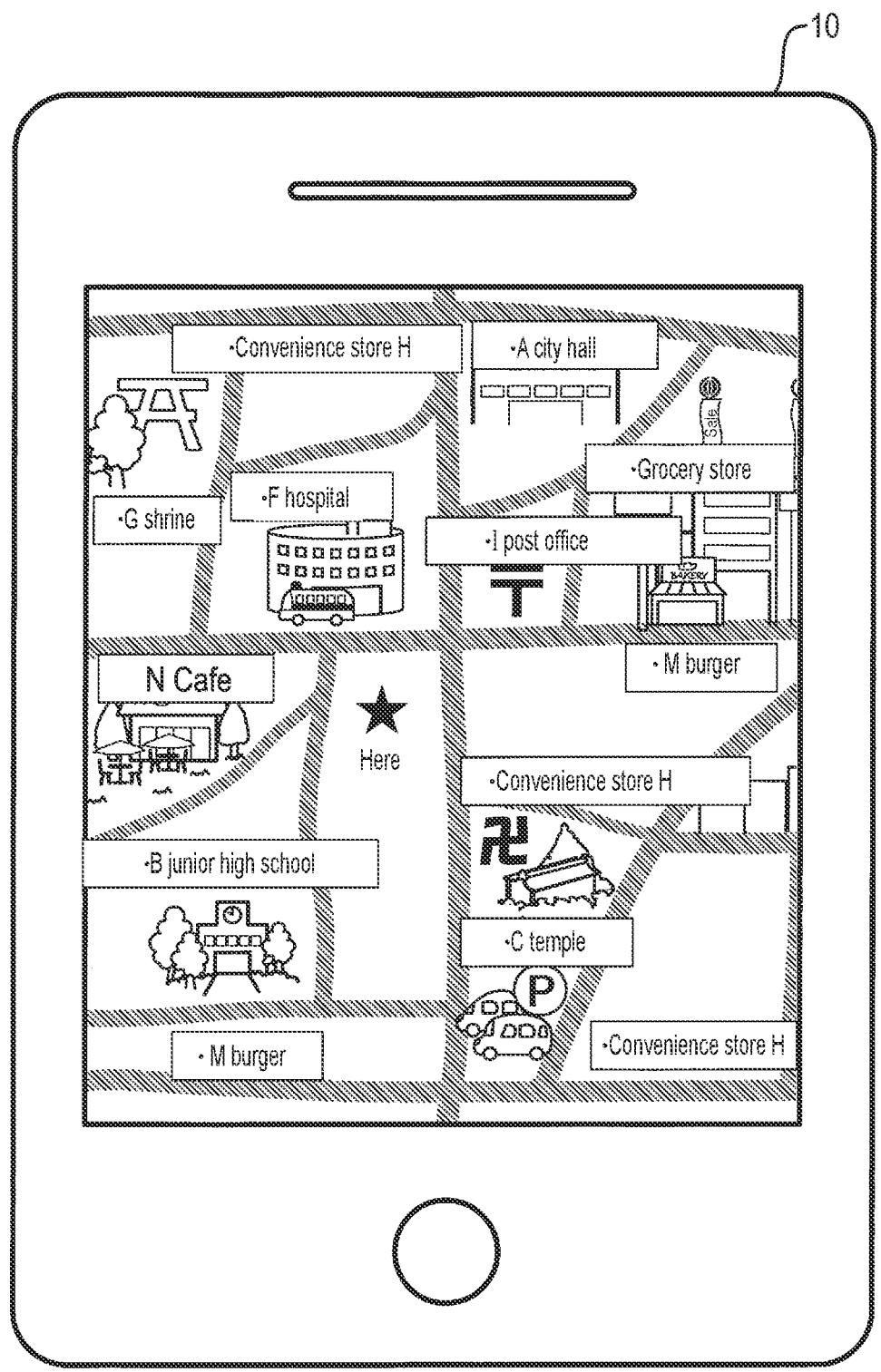
FIG. 12 is a diagram illustrating an output result of an information processing apparatus according to a modification of an exemplary embodiment of the present invention.

In this modification, in the case where specification of a language to be output onto pictorial map information is received by the user request reception unit 32, if the language that is normally used in the information processing apparatus 10 is not English, for indicating a position received by the user request reception unit 32, such as the current position of a user on a pictorial map, the name or the like of a landmark on pictorial map information may be translated into a specified language or a language that is normally used in the information processing apparatus 10, and the name or the like translated into the specified language or the language that is normally used in the information processing apparatus 10 may be output, as illustrated in FIG. 12.

After the current position on the pictorial map information is estimated, by translating the name or the like of a landmark and comparing the translated name or the like with a language in electronic map information including the specified language or the language that is normally used in the information processing apparatus 10, the name or the like in an appropriate language may be output. Accordingly, the accuracy of position detection may be increased, and the accuracy of translation may be improved by mistranslation being reduced.

[Fourth Modification]

The information processing apparatus 10 according to an exemplary embodiment may output additional information onto pictorial map information, the additional information related to a landmark on the pictorial map information, when indicating a position received by the user request reception unit 32 on a pictorial map.

In this modification, when the name of a landmark is extracted from pictorial map information by the characteristic information extraction unit 36, an information icon is created based on the extracted landmark name as a keyword, and related information is searched for using an external search engine of an external service by Google Inc. or the like. The details of information to be searched for is defined in advance.

Specifically, when extracting "N Cafe" as characteristic information, the characteristic information extraction unit 36 creates an information icon near "N Cafe", and searches for related information using an external search engine based on "N Cafe" as a keyword. For information to be searched for, opening hours, the uniform resource locator (URL) of a homepage, and the like are defined. Then, related information is stored.

Figure 13:
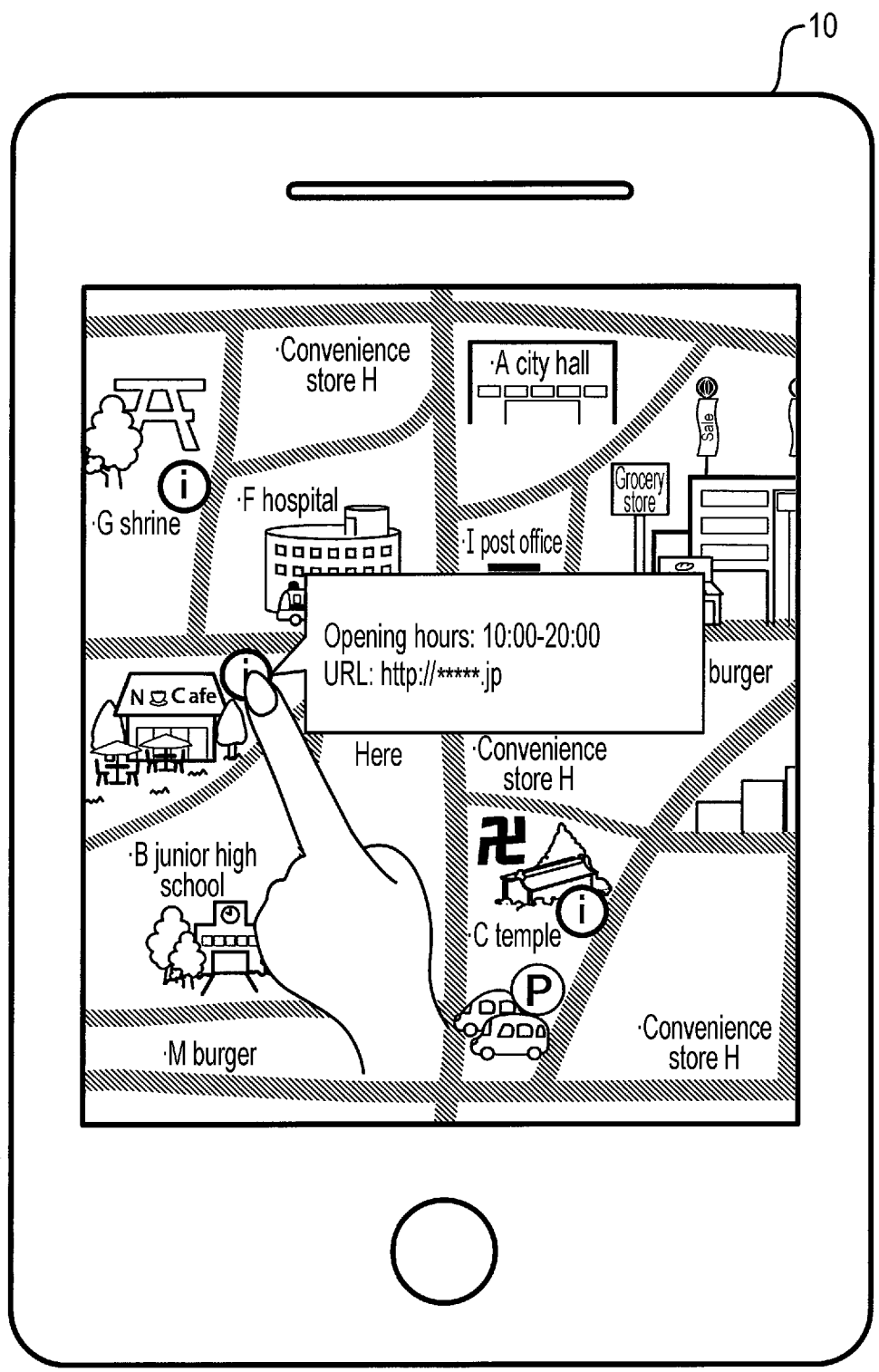
FIG. 13 is a diagram illustrating an output result of an information processing apparatus according to a modification of an exemplary embodiment of the present invention.

That is, as illustrated in FIG. 13, when a user taps an information icon, related information of "N Cafe" is indicated. Then, in the case where a URL or the like is included in the related information, when the user taps the URL, access to a link destination such as the homepage of "N Cafe" may be achieved.

In an exemplary embodiment, a case where a portable information processing apparatus such as a smartphone or a tablet terminal apparatus is used as the information processing apparatus 10 has been described. However, the present invention is not limited to this. A multifunction apparatus may be used. In this case, a multifunction apparatus needs to include a function to acquire positional information. For example, the multifunction apparatus needs to include a GPS function, a function to register positional information, or a function to allow users to input position identification information such as latitude and longitude information. Furthermore, the multifunction apparatus may input a facility name on a UI screen as the input unit 24 or acquire positional information. The multifunction apparatus may include a scanner as the input unit 24 and print and output a specified position such as the current position on electronic pictorial map information based on a pictorial map read with the scanner.

Furthermore, in an exemplary embodiment, a configuration in which the control server 12 acquires electronic map information from the electronic map information server 14 has been described. However, the present invention is not limited to this. The information processing apparatus 10 may acquire electronic map information from the electronic map information server 14.

Furthermore, in an exemplary embodiment, a configuration including the control server 12 has been described. However, the present invention is not limited to this. The information processing apparatus 10 may perform the above-described operation of the control server 12.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
an acquisition unit that acquires an electronic representation of a pictorial map, the pictorial map being a map on a paper medium, the acquisition unit having a camera configured to acquire the electronic representation of the pictorial map from the pictorial map;
a reception unit configured to receive information, from a control unit that acquires stored electronic map information from a server, of a desired position to be output onto the electronic representation of the pictorial map; and
an output unit that outputs the desired position received by the reception unit onto the electronic representation of the pictorial map, consequent to an estimation of the desired position based upon a relative position relationship between characteristic information on the electronic representation of the pictorial map and characteristic information on the electronic representation of the pictorial map around a current position on the electronic map information.

2. The information processing apparatus according to claim 1, further comprising:
a positional information acquisition unit that acquires positional information of a current position,
wherein the reception unit receives the positional information of the current position acquired by the positional information acquisition unit as the information of the position to be output onto the electronic representation of the pictorial map.

3. The information processing apparatus according to claim 1, further comprising:
an extraction unit that extracts a predetermined object on the electronic representation of the pictorial map as the characteristic information; and
an estimation unit that estimates the position received by the reception unit on the pictorial map, based on the characteristic information extracted by the extraction unit and the electronic map information in which the position identification information including the position to be output onto the pictorial map is set,
wherein the output unit outputs the position estimated by the estimation unit onto the electronic representation of the pictorial map.

4. The information processing apparatus according to claim 3,
wherein the extraction unit extracts a name of the object on the electronic representation of the pictorial map and a position of the name on the pictorial map information as the characteristic information.

5. The information processing apparatus according to claim 4,
wherein the estimation unit estimates the position received by the reception unit on the pictorial map, preferentially using characteristic information of an object that is less likely to have a same name as other information, from among a plurality of pieces of characteristic information extracted by the extraction unit, based on the characteristic information and the electronic map information in which the position identification information including the position to be output onto the pictorial map is set.

6. The information processing apparatus according to claim 3,
wherein the estimation unit estimates the position received by the reception unit on the pictorial map, using a relative positional relationship of a plurality of pieces of characteristic information around the position received by the reception unit on the electronic map information.

7. The information processing apparatus according to claim 3,
wherein the extraction unit extracts a name of the object on the electronic representation of the pictorial map and a position of a symbol representing the position of the object as the characteristic information.

8. The information processing apparatus according to claim 7,
wherein the estimation unit estimates the position received by the reception unit on the pictorial map, preferentially using the characteristic information of the object that is assigned the symbol representing the position of the object, from among a plurality of pieces of characteristic information extracted by the extraction unit, based on the characteristic information and the electronic map information in which the position identification information including the position to be output onto the pictorial map is set.

9. The information processing apparatus according to claim 3,
wherein the extraction unit extracts a position of an intersection of roads on the electronic representation of the pictorial map as the characteristic information.

10. The information processing apparatus according to claim 3,
wherein the extraction unit extracts a shape of a block obtained by division by a road on the electronic representation of the pictorial map as the characteristic information.

11. The information processing apparatus according to claim 10,
wherein the estimation unit estimates the position received by the reception unit on the pictorial map, based on the shape of the block obtained by division by the road on the electronic representation of the pictorial map extracted by the extraction unit as the characteristic information and the shape of the block obtained by division by the road on the electronic map information in which the position identification information including the position to be output onto the pictorial map is set.

12. The information processing apparatus according to claim 3,
wherein the extraction unit extracts a shape of a road on the electronic representation of the pictorial map as the characteristic information.

13. The information processing apparatus according to claim 12,
wherein the estimation unit estimates the position received by the reception unit on the pictorial map, based on the shape of the road on the electronic representation of the pictorial map extracted by the extraction unit as the characteristic information and the shape of the road on the electronic map information in which the position identification information including the position to be output onto the pictorial map is set.

14. The information processing apparatus according to claim 1,
wherein the reception unit includes a language reception part that receives specification of a language to be output onto the pictorial map information, and
wherein the output unit translates a name of an object on the pictorial map information into the language received by the language reception part and outputs the name of the object translated in the received language.

15. The information processing apparatus according to claim 1, wherein the output unit outputs additional information related to an object on the electronic representation of the pictorial map onto the electronic representation of the pictorial map.

16. The information processing apparatus according to claim 1, wherein the output unit outputs the desired position based upon a relative position relationship of some of landmarks extracted from the electronic representation of the pictorial map and coordinates of estimated corresponding landmarks extracted from the electronic map information.

17. A non-transitory computer readable medium storing a program causing a computer to execute a process for information processing, the process comprising:
acquiring an electronic representation of a pictorial map, the pictorial map being a map on a paper medium, the acquiring occurring using a camera configured to acquire the electronic representation of the pictorial map from the pictorial map;
receiving information, from a control unit that acquires stored electronic map information from a server, of a desired position to be output onto the electronic representation of the pictorial map; and
outputting the received desired position to be output onto the electronic representation of the pictorial map, consequent to an estimation of the desired position based upon a relative position relationship between characteristic information on the electronic representation of the pictorial map and characteristic information on the electronic representation of the pictorial map around a current position on the electronic map information.

\* \* \* \* \*